ARTHUR L. WALTERS
HARVE H. HENDRICK
INVENTOR

ATTORNEY

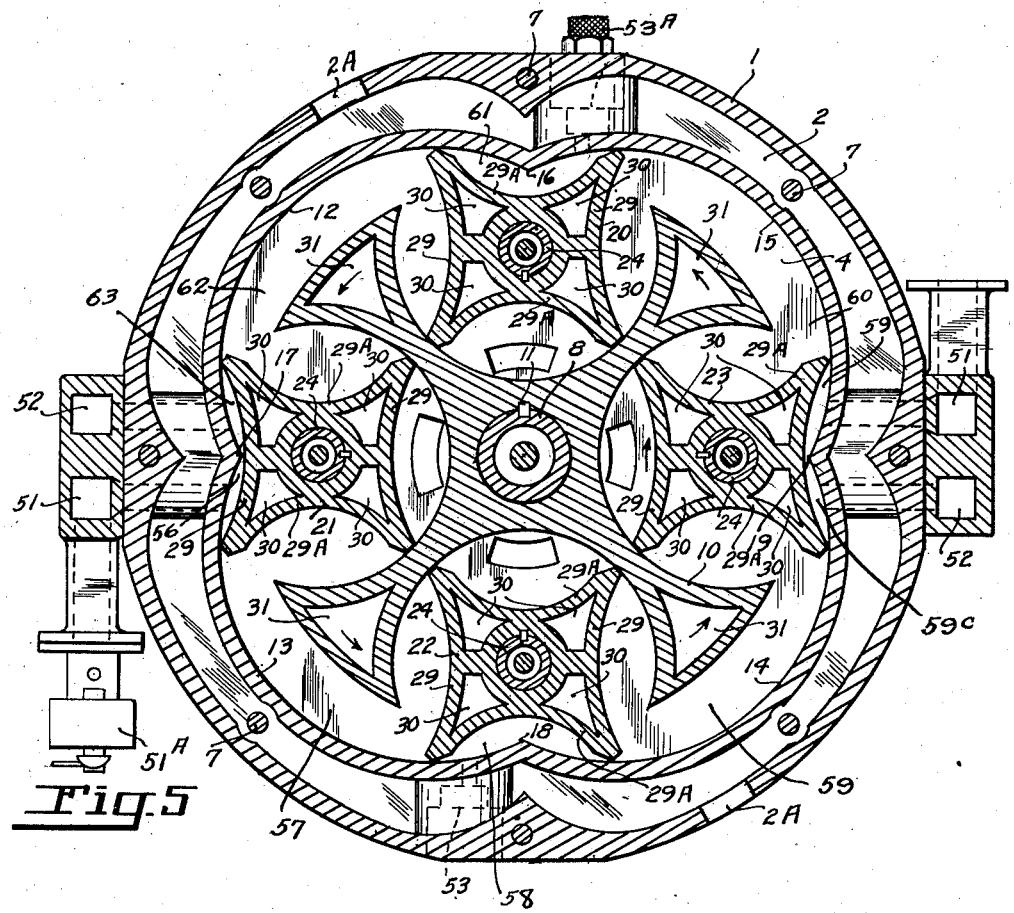

Nov. 8, 1938.  A. L. WALTERS ET AL  2,136,066
ROTARY ENGINE
Filed May 13, 1935    6 Sheets-Sheet 4
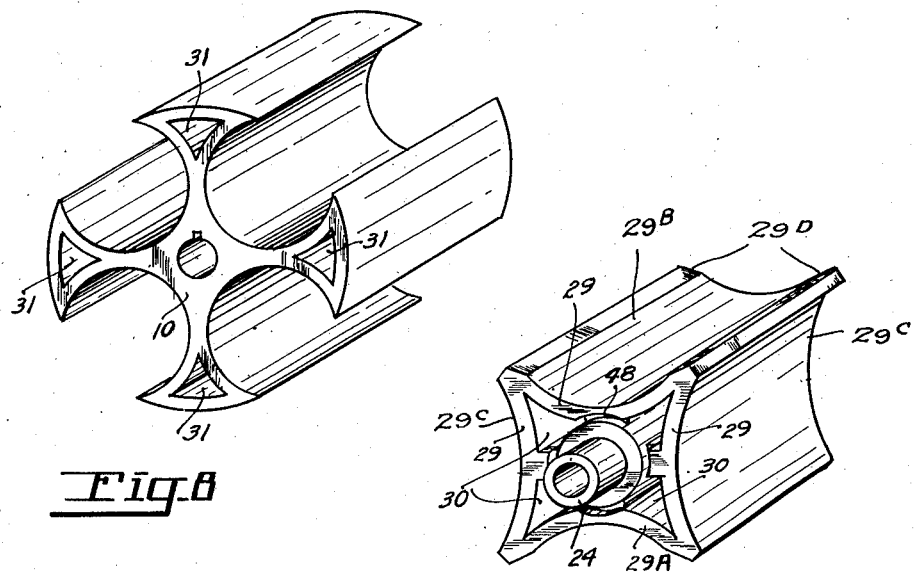
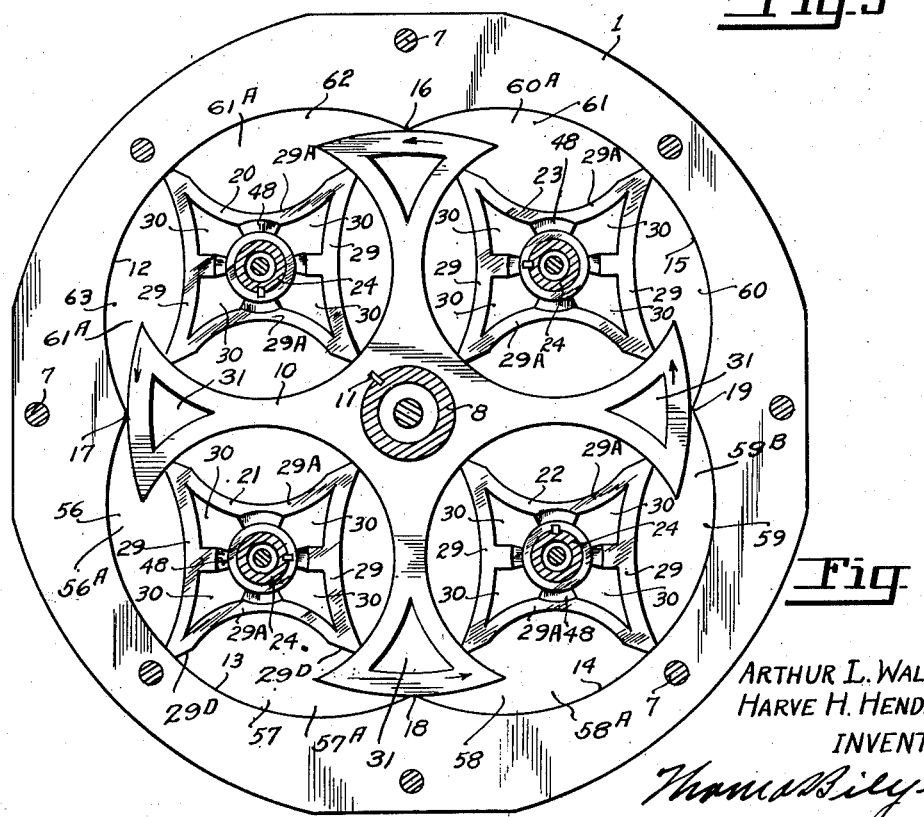
ARTHUR L. WALTERS
HARVE H. HENDRICK
INVENTORS Nov. 8, 1938.  A. L. WALTERS ET AL  2,136,066
ROTARY ENGINE
Filed May 13, 1935  6 Sheets-Sheet 5

SECONDARY ROTOR AT INTAKE MANIFOLD

SECONDARY ROTOR REGISTERING WITH SPARK PLUG

CHARGE OF SECONDARY ROTOR FIRED

SECONDARY ROTOR IN EXHAUST POSITION

INVENTORS
ARTHUR L. WALTERS
HARVE H. HENDRICK

ATTORNEY

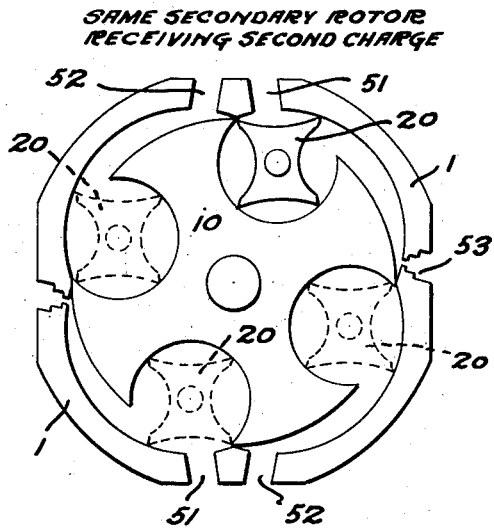
Fig. 14. Same secondary rotor receiving second charge
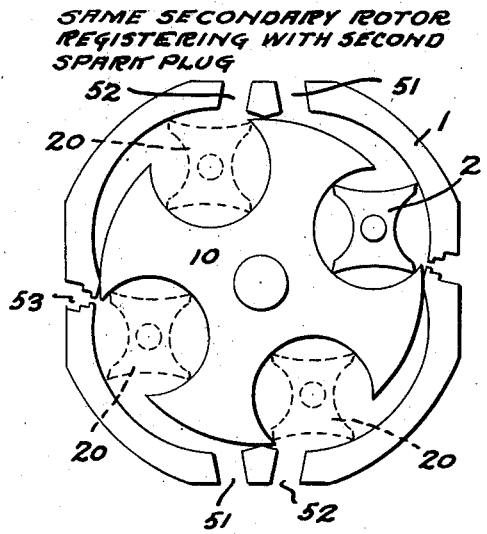
Fig. 15. Same secondary rotor registering with second spark plug
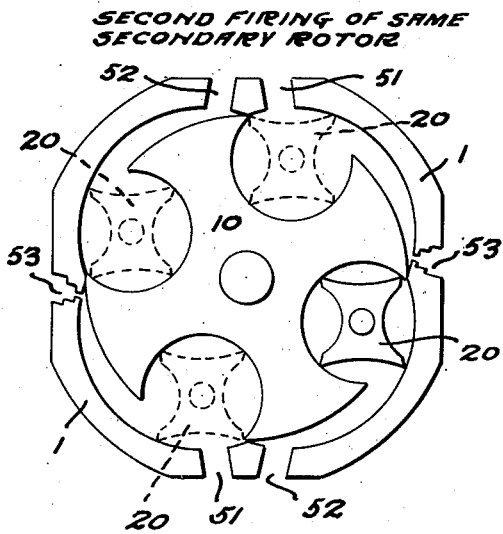
Fig. 16. Second firing of same secondary rotor
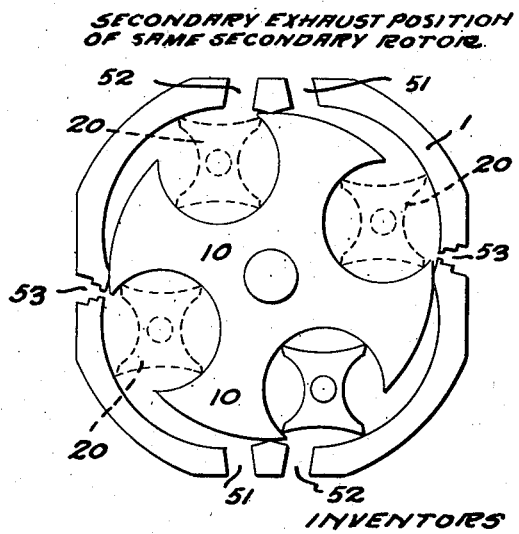
Fig. 17. Secondary exhaust position of same secondary rotor Patented Nov. 8, 1938

2,136,066

UNITED STATES PATENT OFFICE 2,136,066

ROTARY ENGINE

Arthur L. Walters and Harve H. Hendrick, Baker, Oreg., assignors of fifteen per cent to C. J. Bartlett and fifteen per cent to Truman W. Collins Application May 13, 1935, Serial No. 21,286

15 Claims. (Cl. 123—8)

Our invention relates to internal combustion hydrocarbon engines of the rotary type.

The invention is comprised primarily of a pair of end bearings and a central stator with the assembly being enclosed by cylinder heads that are secured to the stator by through-bolts. A sleeve shaft runs transversely of the cylinder heads and a primary rotor is keyed thereto. Secondary rotors coact with the primary rotor and are journaled upon shafts that pass through end bearings. The sleeve shaft and the shafts upon which the secondary rotors are mounted rotate within anti-friction bearings. A driving pinion is secured to the sleeve shaft and the same coacts with a gear that is disposed upon a power take-off shaft. The power take-off shaft is journaled within a pair of anti-friction bearings, one of which is mounted in a recess disposed in one the cylinder heads, the other being disposed within a housing that is secured to the cylinder head. This housing provides a casing in which the gears and anti-friction bearings are disposed that connect the power take-off with the sleeve shaft. Exhaust and intake manifolds are secured to the central stator and spark plugs are also disposed therein.

The primary object of our invention is to provide an engine in which simplicity of construction and simplicity of operation are combined with practical construction design.

Another object of our invention consists in providing an engine that is economical in fuel consumption and one that will have a minimum of parts.

A still further object of our invention is to construct an engine that has no reciprocating parts and one that will be less in weight per horse power than engines now in use.

A still further object of our invention consists in so constructing the engine that it will have a minimum of operating annoyances and will have fewer wearing parts and to be simple in construction.

A still further object of our invention consists in so constructing the same that it will have a minimum of cost considering the horse power developed and will be light in weight to therefore provide an engine for airplane construction that will permit of larger loads being carried because of the lessened weight of the engine itself.

A still further object of our invention consists in so constructing the same that it will have a more uniform torque, and will have a simple rotary motion.

A still further object of our invention consists in so constructing the same that vibration will be reduced to a minimum.

And a still further object of our invention consists in so constructing the same that the power take-off shaft may be disposed at either side of the shaft upon which the primary rotor is disposed therefore providing an engine having low center of gravity and when installed in aircraft permitting the pilot to have a greater range of unobstructed vision.

And a still further object of our invention consists in so constructing the same that inspection may be made of the moving parts by simply removing one of the cylinder heads.

And a still further object of our invention consists in so constructing the engine that reciprocating valves are eliminated.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 5 is a sectional view of the engine. This view is taken on line 5—5 of Fig. 1, looking in the direction indicated.

Fig. 6 is a side view partially in section of the assembled engine. In this view the engine is comprised of two independent units operating within a common shell or casing and each coupled to a common driving shaft.

Fig. 7 is an end view of the engine having the end housing removed to show the construction of the secondary rotors disposed within the stator and illustrating the relationship of the secondary rotors with the primary rotor.

Fig. 8 is a perspective end view of the primary rotor.

Fig. 9 is a perspective end view of one of the secondary rotors.

Figs. 10 to 17 are diagrammatical layouts illustrating cycles of operation of the engine during one revolution thereof.

Like reference characters refer to like parts throughout the several views.

Figure 1:
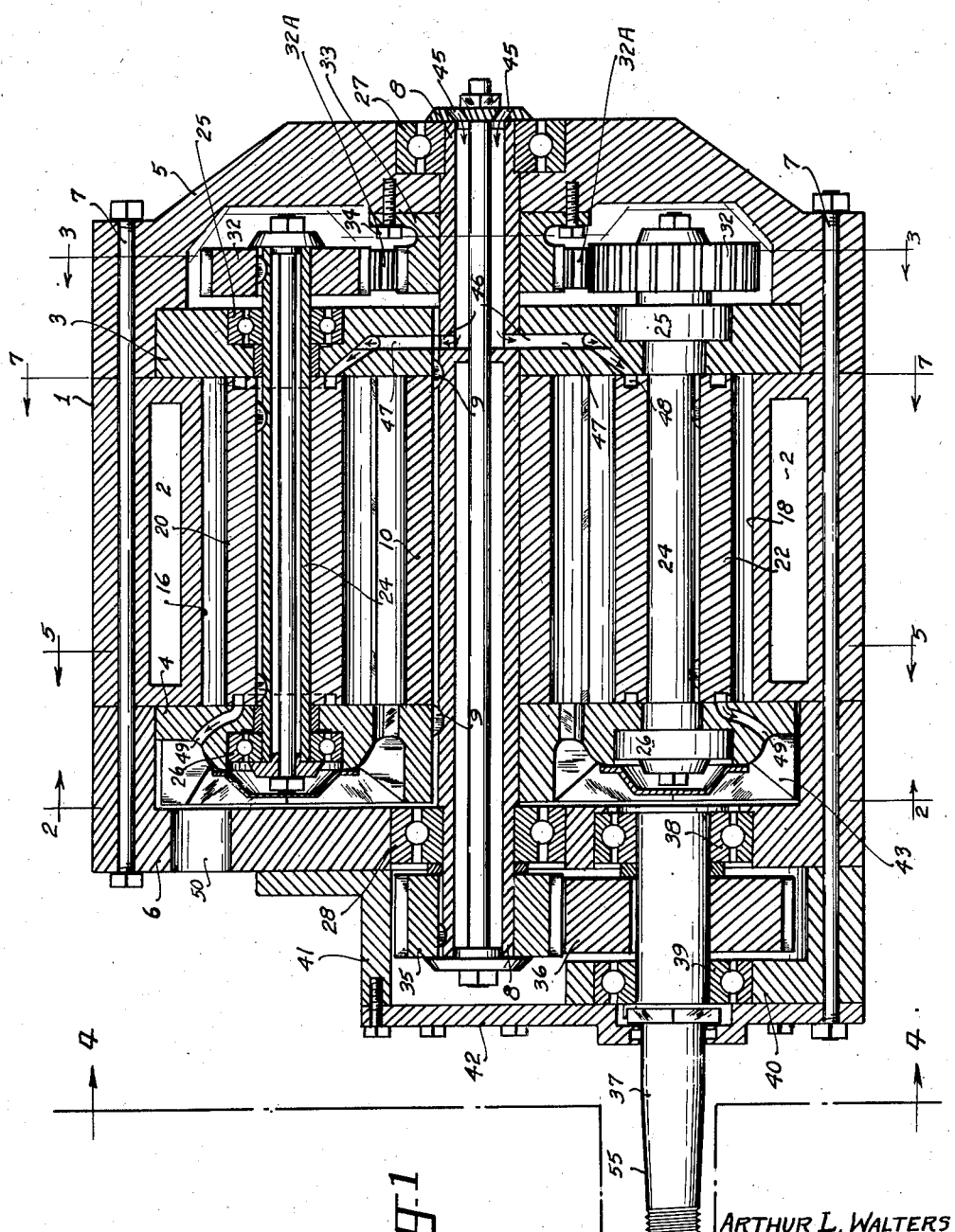
Fig. 1 is a sectional side view of the assembled engine. This view is taken on line 1—1 of Fig. 4 looking in the direction indicated.
Figure 2:
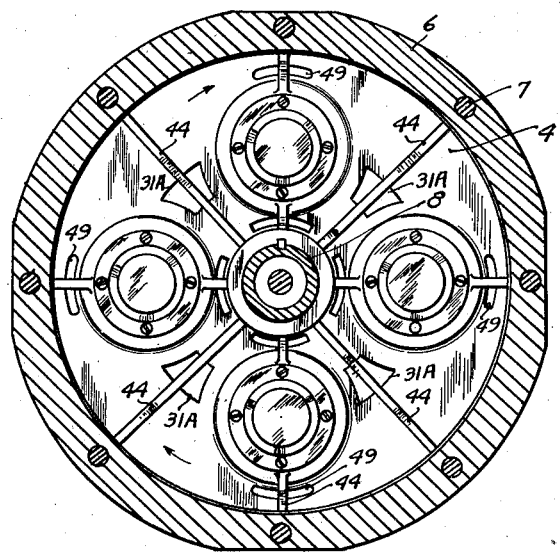
Fig. 2 is a sectional end view of the engine. This view is taken on line 2—2 of Fig. 1, looking in the direction indicated.
Figure 3:
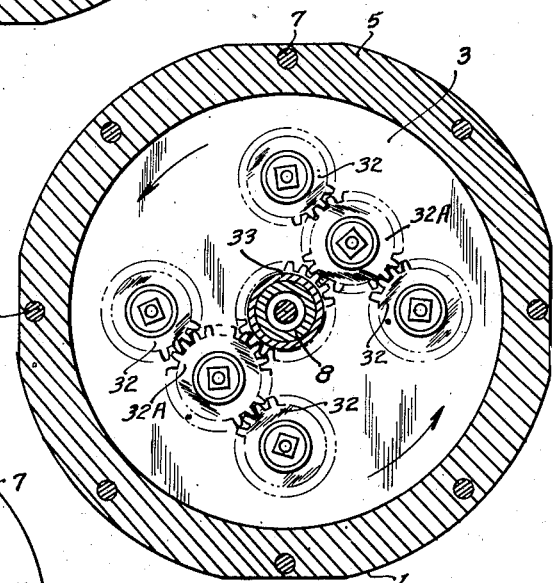
Fig. 3 is a sectional end view of the opposite end of the engine. This view is taken on line 3—3 of Fig. 1, looking in the direction indicated.
Figure 4:
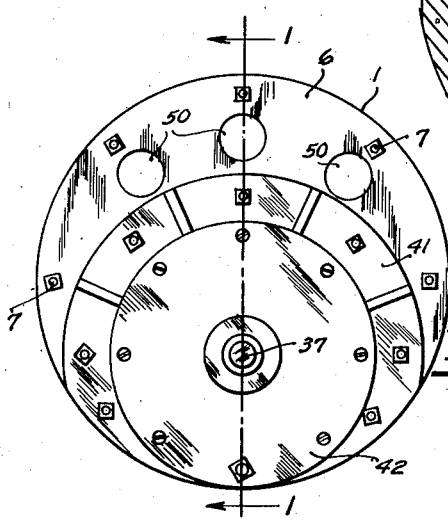
Fig. 4 is an end view of the engine. This view is taken on line 4—4 of Fig. 1, looking in the direction indicated.
Figure 10:
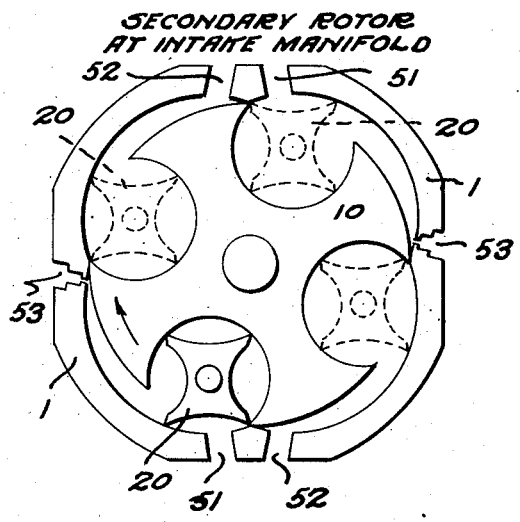
Figure 11:
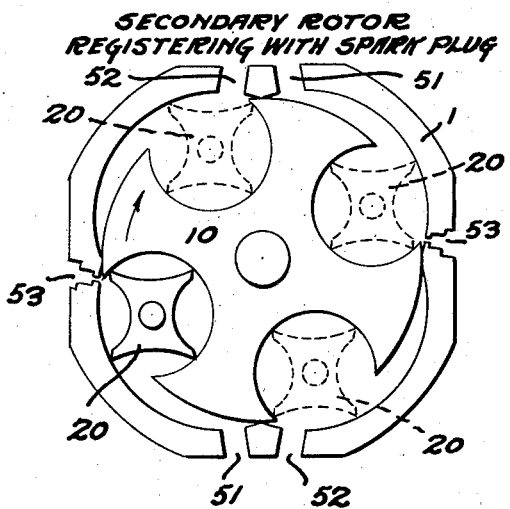
Figure 12:
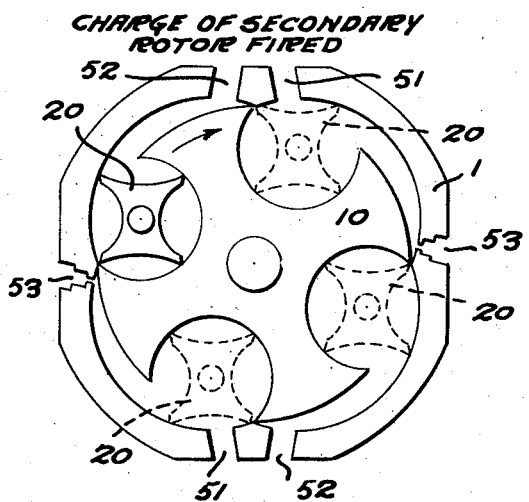
Figure 13:
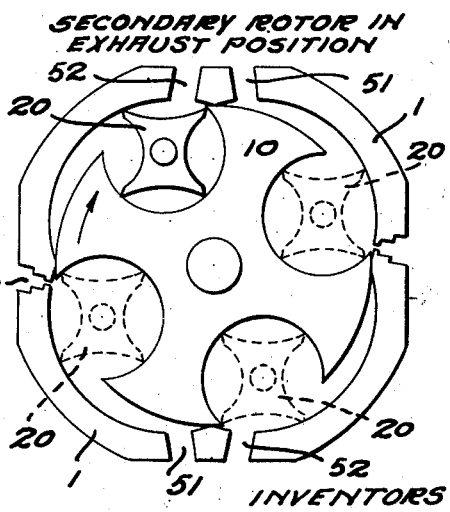

The invention is comprised primarily of a pair of end bearings and a control stator with the assembly being enclosed by cylinder heads that are secured to the stator by through-bolts. A sleeve shaft runs transversely of the cylinder heads and a primary rotor is keyed thereto. Secondary rotors coact with the primary rotor and are journaled upon shafts that pass through end bearings. The sleeve shaft and the shafts upon which the secondary rotors are mounted rotate within anti-friction bearings. A driving pinion is secured to the sleeve shaft and the same coacts with a gear that is disposed upon a power take-off shaft. The power take-off shaft is journaled within a pair of anti-friction bearings, one of which is mounted in a recess disposed in one of the cylinder heads, the other being disposed within a housing that is secured to the cylinder head. This housing provides a casing in which the gears and anti-friction bearings are disposed that connect the power take-off with the sleeve shaft. Exhaust manifolds are secured to the central stator and spark plugs are also disposed therein.

In the construction of the engine we form a central stator 1. The stator is cored circumferentially to provide a passageway as illustrated at 2 and a cooling medium is circulated therethrough by any suitable circulating means through ports 2A. End plates 3 and 4 are disposed within the housing formed by the stator 1 and by the end casings 5 and 6. The end casings are disposed at the opposite ends of the stator and are secured thereto by any suitable fastening bolts as through the use of through-bolts 7. A central sleeve shaft 8 passes longitudinally and centrally through the assembly and the end plates 3 and 4 are keyed thereupon by the use of Woodruff keys 9.

A primary rotor 10 is fixedly positioned upon the sleeve shaft 8 through the use of a key 11. The inner periphery of the central portion of the stator comprises a plurality of similar symmetrical intersecting substantially cylindrical concave surfaces, here shown as four in number at 12, 13, 14 and 15. Adjacent pairs of these substantially cylindrical surfaces intersect along lines which are projections of points 16, 17, 18 and 19, and are mutually parallel to and equidistant from the axis of sleeve shaft 8. It is to be noted that for structural reasons hereinafter disclosed, each of the surfaces 12 to 15 inclusive departs from circular cylindrical segments along its mid-section by a cylindrical zone tangent thereto and its axis coaxial with the axis of shaft 8. Such construction necessitates separate spaced axes of generation of the two circular cylindrical segments flanking each of the median zones.

A plurality of secondary rotors, here shown as four in number at 20, 21, 22 and 23 are each supported upon a sleeve shaft 24. Each of the sleeve shafts 24 runs longitudinally of the secondary rotors and the longitudinal center line of the same is common to that of the longitudinal center line of the secondary rotor. Bearing supports are disposed in each of the end plates 3 and 4 and in these end plates anti-friction bearings 25 and 26 are placed for the supporting of the sleeves upon which each of the secondary rotors is disposed. The sleeve shaft 8 is journaled within the end casings by the placing of anti-friction bearings, as ball bearings 27 and 28 therein. The primary rotor 10 has a plurality of like cylindrical segments disposed therein and in each of which one of the secondary rotors is made to revolve. Each of the secondary rotors rotates relative to the axis of the cylindrical segment of the primary rotor in which it is recessed, and all of the secondary rotors revolve in a common orbit about the axis of rotation of the primary rotor.

The secondary rotors are each provided with a plurality of pairs of oppositely disposed concave peripheral walls, here shown as two in number, 29 and 29A. The exterior surfaces 29c of opposite walls 29 are similar cylindrical segments, generated about axes parallel to the axis of rotation of the secondary rotors. The radius of the cylindrical segments is such that small clearances are maintained between the surfaces of concave walls 29 and apices 17 and 19, see Fig. 5. The exterior surfaces 29d of the concave walls 29A are similarly generated at their sides, and are provided with a median portion 29b, generated with a radius less than that required for walls 29 and 29a, thus providing firing chambers as at 57 and 61 when spanning adjacent apices 16 and 18 and forming single chambers thereabout when so positioned. The secondary rotors may be cored longitudinally so that walls 29 and 2A have each a uniform thickness to provide a cored space 30 that extends longitudinally therethrough. To lighten the construction of the primary rotor, we core each of the wings in like amount, as illustrated at 31 in Fig. 8. This lightens the construction of the primary rotor. Pinions 32 are mounted upon each of the sleeve shafts 24 of the secondary rotors and the same coact through idler gears 32A with a gear 33 that is fixedly secured to the end casing 5.

The hub of the gear 33 is secured to the end casing 5 through the use of fastening bolts 34. The primary rotor is keyed at 11 to the sleeve shaft 8 and the secondary rotors are rotated relative to the primary rotor by the pinions 32 coacting through the idler gear 32A engaging with the fixed pinion 33. A driving pinion 35 is keyed to the sleeve shaft 8 and the pinion 35 coacts with and drives a gear 36 that is keyed to the power take-off shaft 37.

The ratio of the gear train from fixed gear 33 through idler gears 32A to pinions 32 is such that the secondary rotors all maintain a zero angular velocity about their own axes, while revolving in an orbit about the axis of the primary rotor. Thus any set of parallel lines normal to and intercepting the axes of the secondary rotors maintains its parallel relationship and also remains at a fixed angle with any stationary reference plane.

Anti-friction bearings 38 and 39 are mounted respectively within the end casing 6 and within the head 40 of the housing 41. The housing 41 is secured to the end casing 6, and the housing head 42 is removably secured to the housing 41. The end plate 4 has a circulating fan 43 formed integral therewith so that as the end plate 4 is rotated a suction is created by the vanes 44 that are formed integral with the end plate 4.

The motor is cooled internally by the circulation of air therethrough. The air is admitted through ports 45 disposed in one end of the sleeve shaft 8. The cooling air then passes outwardly through ports 46 disposed within the sleeve and enters ports 47 that are disposed in registry therewith within the end plate 3 and outwardly through ports 48 that are disposed in the secondary rotors as disclosed in Fig. 9. The air passes through the secondary rotors and outward therefrom through a port 49 disposed within the end plate 4 and is then discharged to the atmosphere through the end casing 6 through the discharge port 50. The cooling of the primary rotor is effected by the passage of air through the ports 46a that are disposed in the sleeve 8, thence through the ports 31 that are disposed in the primary rotor via ports 31A in registry therewith that are disposed in the end plates 3 and 4.

Suitable fuel is delivered into the engine, as by carbureters 51a, through the inlet ports 51 placed at the oppositely disposed sides of the engine and the exhaust gases are released through the exhaust ports 52. Spark plugs 53a are placed within the threaded receiving holes 53 that are disposed in the stator in spaced relation to the inlet and exhaust ports.

The cycle of operation of our device is as follows:

As shown in Fig. 5, a charge of carburetted fuel is being drawn into chambers 63 and 59 through inlet ports 51. Continued rotation of the primary rotor 10 causes these chambers to increase in volume as shown in Fig. 7 at 56a and 59a. Still further rotation causes further increase in volume, until the following secondary rotor closes the inlet port, as shown in Fig. 5 at 57 and 61. Still further rotation decreases the volume, effecting some compression, as shown at 57a and 60a in Fig. 7. Compression is at maximum when the volume is reduced as shown at 58 and 61 in Fig. 5. Ignition by spark plugs 53a is now effected and the expending charge assumes a greater volume as at 58a and 61a in Fig. 7. Expansion continues to a volume indicated at 59b and 62a in Fig. 5, at which point exhaust ports 52 are about to be uncovered to the expanding charge. Continued rotation of the primary rotor 10 causes expulsion of the burned gases as shown at 59a and 62a in Fig. 7, and exhaust is substantially completed when the chambers are as shown at 59c and 63 in Fig. 5. It is thus to be seen that each spark plug ignites four fresh charges each revolution of the primary rotor as shown in Figs. 5 and 7.

Referring further to Figs. 5 and 7, it is to be noted that the secondary rotors do not rotate relative to the stator 1; they do, however, revolve upon a circular orbit within the stator. With reference to the primary rotor 10, the secondary rotors do rotate.

While the form of mechanism herein shown and described is admirably adapted to fulfill the objects primarily stated; it is to be understood that it is not intended to confine the invention to the embodiment herein shown and described, as it is susceptible of embodiment in various forms, all coming within the scope of the claims which follow.

What we claim is:

1. In a device of the class described, the combination of a ported stator, said stator having its inner surface formed of a plurality of like and uniform cylindrical segments the axes of which being eccentric relative to the central axis of said stator, a shaft disposed transversely of the stator and journaled therein, a primary rotor fixedly disposed upon the shaft, said rotor having four wings, like in shape and equally spaced apart, and plates fixed to the shaft upon which the primary rotor is mounted and abutting the opposite ends of the primary rotor and secondary rotors journaled within the end plates and rotatable relative to the wings of the primary rotor and means for rotating the secondary rotors in timed relation with the primary rotor and with each other.

2. In a device of the class described, a sleeve shaft, end plates keyed to the sleeve shaft, ported primary rotors fixedly mounted upon the sleeve shaft and disposed between the end plates, said primary rotor being comprised of like, uniformly spaced wings, secondary rotors disposed one between each of the wings of the primary rotor and journaled within the end plates, means for rotating the secondary rotors in timed relationship with the rotation of the primary rotor, and a ported stator, said stator having its inner surface formed of a plurality of like and uniform cylindrical segments the axes of which being eccentric relative to the central axis of said stator, the inner surface of the central portion of which is comprised of segments of circles equal in number to the wings of the primary rotor or to the number of the secondary rotors.

3. In an engine of the class described, the combination of a stator, said stator having its inner surface formed of a plurality of like and uniform cylindrical segments the axes of which being eccentric relative to the central axis of said stator, a shaft journaled within the heads of the stator, a primary rotor having equally spaced and like wings mounted upon the shaft, end plates keyed to the shaft and abutting the ends of the primary rotor, secondary rotors journaled within the end plates, and the number of the secondary rotors corresponding to the number of the wings of the primary rotor and means for rotating the secondary rotors in timed relationship with the primary rotor and with each other.

4. In a device of the class described, in combination, a stator, said stator having its inner surface formed of a plurality of like and uniform cylindrical segments the axes of which being eccentric relative to the central axis of said stator, a primary rotor rotatably disposed relative to the stator, a plurality of secondary rotors, and means for rotating the secondary rotors in timed relation with the primary rotor, said secondary rotors having four concave faces with the opposite faces having like concavity and the faces of the adjacent concavities being different.

5. In a device of the class described, the combination of an explosive engine stator, said stator having its inner surface formed of a plurality of like and uniform cylindrical segments the axes of which being eccentric relative to the central axis of said stator, a sleeve shaft disposed transversely of the stator, a primary rotor and a plurality of faced secondary rotors disposed within the stator and arranged to be driven in timed relation with each other, the faces of each of the secondary rotors being concave and the opposite faces having a like contour.

6. In a device of the class described, the combination of an engine stator, said stator having its inner surface formed of a plurality of like and uniform cylindrical segments the axes of which being eccentric relative to the central axis of said stator, primary and secondary rotors disposed within the stator, and means for driving the rotors in timed relation with each other, the secondary rotors having an even number of concave faces of which the opposite faces are like and similar and the adjacent faces are unlike and dissimilar to the first mentioned faces.

7. In a device of the class described, the combination of a ported stator, said stator having its inner surface formed of a plurality of like and uniform cylindrical segments the axes of which being eccentric relative to the central axis of said stator, end plates disposed within the central stator, end casings encasing the end plates and removably secured by common supports to the central stator, a sleeve shaft coaxial with the end casings, a primary rotor secured to the sleeve shaft and secondary rotors journaled relative to the end plates, a power take-off shaft, means for driving the same from the sleeve shaft and instrumentalities for effecting fuel introduction, compression, explosion, expansion and exhaustion.

8. A rotary internal combustion engine comprising a primary rotor, a plurality of secondary rotors cooperatively engaged with the primary rotor, means for maintaining the secondary rotors in constant unidirectional position, a ported stator encompassing the primary and the secondary rotors, said stator having its inner surface formed of a plurality of like and uniform cylindrical segments the axes of which being eccentric relative to the central axis of said stator, and instrumentalities for effecting fuel introduction, compression, explosion, expansion and exhaustion.

9. A rotary internal combustion engine comprising a primary rotor having a plurality of parallel cylindrical concavities, a plurality of secondary rotors embraced by the said cylindrical concavities and each provided with a plurality of curved surfaces, a stator embracing the primary and secondary rotors, said stator having its inner surface formed of a plurality of like and uniform cylindrical segments the axes of which being eccentric relative to the central axis of said stator, means for maintaining the primary rotor, the secondary rotors and the housing in timed operating relationship, and instrumentalities for effecting fuel introduction, compression, explosion, expansion and exhaustion.

10. In a rotary engine comprising a stator, said stator having its inner surface formed of a plurality of like and uniform cylindrical segments the axes of which being eccentric relative to the central axis of said stator, a primary rotor disposed within the stator and a plurality of secondary rotors cooperating with the primary rotor, means for maintaining the secondary rotors in individual mutual radially unidirectional position.

11. In a rotary engine, a stator, said stator having its inner surface formed of a plurality of like and uniform cylindrical segments the axes of which being eccentric relative to the central axis of said stator, a primary rotor rotatably mounted in the stator, and a plurality of secondary rotors mounted rotatably with reference to the primary rotor and revolvably with reference to the stator.

12. A rotary internal combustion engine comprising a central stator, said stator having its inner surface formed of a plurality of like and uniform cylindrical segments the axes of which being eccentric relative to the central axis of said stator, end plates removably disposed in the opposite ends of the stator, two end casings secured to the stator and fixed relative thereto, a sleeve shaft keyed transversely of the end casings and stator, a primary rotor fixed to the sleeve shaft and the end plates, secondary rotors disposed within the primary rotor coacting with the primary rotor, and supported to the end plates, means for circulating a cooling medium into the sleeve shaft and through the secondary rotors via the end plates and one end casing, gearing associated with the other end casing of the secondary rotors for maintaining synchronized relationship between the primary rotor, the secondary rotors and the stator, and instrumentalities for effecting fuel introduction, compression, explosion, expansion, and exhaustion.

13. A rotary engine comprising a central stator, said stator having its inner surface formed of a plurality of like and uniform cylindrical segments the axes of which being eccentric relative to the central axis of said stator, and end casings, gear supporting shafts secured to the end casings, means for securing the assembly together, a sleeve shaft disposed centrally of the assembly and journaled within anti-friction bearings secured within the end casings, a primary rotor keyed to the sleeve shaft, end plates secured to the primary rotor, secondary rotors journaled in the end plates and coacting with the primary rotor, coacting gears mounted upon the end casings and the shafts of the secondary rotors to position the secondary rotors in fixed relation with the sleeve shaft, a power take-off shaft driven by the sleeve shaft and inlet and exhaust ports disposed through the central stator, and spark plugs secured to the central stator and spaced apart from each other and from the inlet ports.

14. A rotary engine comprising a central stator, said stator having its inner surface formed of a plurality of like and uniform cylindrical segments the axes of which being eccentric relative to the central axis of said stator, and end casings, a plurality of shafts carried by the end casing, means for securing the assembly together, a sleeve shaft disposed centrally of the assembly and journaled within anti-friction bearings secured within the end casings, a primary rotor keyed to the sleeve shaft, end plates secured to the primary rotor, secondary rotors journaled in the end plates and coacting with the primary rotor, coacting gears mounted upon an end casing, and the shafts of the secondary rotors to position the secondary rotors in fixed relation with the sleeve shafts, and inlet and exhaust ports disposed through the central stator.

15. A rotary internal combustion engine comprising a ported stator, said stator having its inner surface formed of a plurality of like and uniform cylindrical segments the axes of which being eccentric relative to the central axis of said stator, end casings disposed at the opposite ends of the stator, a sleeve shaft disposed longitudinally of the stator and passing through the end casings, a primary rotor secured to the sleeve shaft and rotatable relative to the stator, the end plates being fixed relative to the primary rotor by being removably secured thereto, a plurality of smaller rotors, a shaft for each rotor, each having a plurality of faces disposed between the end plates and the faces being disposed in pairs with the faces of each pair being similar and concave and of uniform curvature and the faces of the other pair being dissimilar to the first pair but being similar to each other and the curvature of the faces of the last mentioned pair being uniform and alike.

ARTHUR L. WALTERS.
HARVE H. HENDRICK.